US008799490B2

(12) United States Patent
Ayers et al.

(10) Patent No.: US 8,799,490 B2
(45) Date of Patent: Aug. 5, 2014

(54) AUTOMATED APPLICATION SERVER (AS) PERMISSIONS PROVISIONING

(75) Inventors: John I. Ayers, Omaha, NE (US); Jeffrey M. Cameron, Omaha, NE (US); Srinivas Chilukuri, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2216 days.

(21) Appl. No.: 11/213,363

(22) Filed: Aug. 26, 2005

(65) Prior Publication Data

US 2007/0047558 A1    Mar. 1, 2007

(51) Int. Cl.
 *G06F 15/16*    (2006.01)
(52) U.S. Cl.
 USPC .......................................... 709/229
(58) Field of Classification Search
 USPC .......................................... 709/229
 See application file for complete search history.

(56) References Cited

U.S. PATENT DOCUMENTS

| | | | |
|---|---|---|---|
| 7,613,705 B2 | 11/2009 | Ayers et al. | |
| 2003/0163545 A1* | 8/2003 | Koskelainen et al. | 709/217 |
| 2004/0158618 A1* | 8/2004 | Shaw | 709/217 |
| 2004/0186901 A1* | 9/2004 | Guigui | 709/217 |
| 2004/0193700 A1* | 9/2004 | Westman et al. | 709/219 |
| 2004/0234060 A1* | 11/2004 | Tammi et al. | 379/204.01 |
| 2005/0136926 A1* | 6/2005 | Tammi et al. | 455/435.1 |
| 2005/0155036 A1* | 7/2005 | Tiainen et al. | 719/310 |
| 2005/0190772 A1 | 9/2005 | Tsai et al. | |
| 2005/0278420 A1* | 12/2005 | Hartikainen et al. | 709/203 |
| 2006/0035637 A1 | 2/2006 | Westman | |
| 2006/0140385 A1 | 6/2006 | Haase et al. | |
| 2006/0212511 A1 | 9/2006 | Garcia-Martin | |
| 2006/0225128 A1* | 10/2006 | Aittola et al. | 726/3 |
| 2007/0002779 A1 | 1/2007 | Lee et al. | |
| 2007/0046253 A1 | 3/2007 | Ayers | |
| 2007/0047558 A1 | 3/2007 | Ayers et al. | |
| 2007/0209061 A1* | 9/2007 | Dekeyzer et al. | 726/3 |
| 2009/0227236 A1* | 9/2009 | Sanchez Herrero et al. | 455/414.1 |

FOREIGN PATENT DOCUMENTS

| | | |
|---|---|---|
| WO | WO 2004/088950 | 10/2004 |
| WO | WO 2004/088950 A | 10/2004 |
| WO | WO 2004/089023 | 10/2004 |
| WO | WO 2004/089023 A | 10/2004 |

OTHER PUBLICATIONS

European Patent Office; Patent Search Report for Appl. PCT/US2006/027874; dated Dec. 8, 2006.
European Patent Office; Written Opinion of Int'l. Searching Authority for Appl. PCT/US2006/027874; dated Dec. 8, 2006.

(Continued)

*Primary Examiner* — Krista Zele
*Assistant Examiner* — Esther Benoit

(57) ABSTRACT

Systems, methodologies, media, and other embodiments associated with provisioning an Internet Protocol (IP) core network services multimedia subsystem (IMS) are described. One exemplary system embodiment includes a Home Subscriber Server (HSS) logic operably connectable to components including, a user database, an application server (AS), and a permissions database. The HSS logic may be a component of an IMS that facilitates communications between application servers and users. Thus, the HSS logic may be configured to receive an AS-to-user-database-interface-message (AUDIM) and to selectively update the permissions database based, at least in part, on the AUDIM. The user database may store user data concerning IMS users and the permissions database may store information for controlling AUDIM initiated interactions between an AS and the user database.

16 Claims, 7 Drawing Sheets

(56) References Cited

OTHER PUBLICATIONS

Wikipedia, The Free Encyclopedia, IP Multimedia Subsystem, http://en.wikipedia.org, pp. 1-8, prior to Aug. 2005.
European Patent Office; Patent Search Report & Written Opinion of Int'l. Searching Authority for Appl. PCT/US2006/027874; dated Dec. 8, 2006.
Sophia-Antipo; Digital Cellular Telecom. System (Phase 2+) ETSI Standards; Jun. 2005; pp. 7-8, 13-15; vol. 3-CN4, No. V5100; European Telecom. Standards Institute; France.
International Search Report; dated Dec. 12, 2006.
Written Opinion of the International Searching Authority or the Declaration; dated Dec. 12, 2006.
International Preliminary Report on Patentability; Dated Aug. 26, 2005.
Hoffer et al: Logical Database Design and the Relational Model; Library of Congress Cataloging-in-Publication Data; Modern Database Management seventh edition; pp. 1987-226.
Response to European Search report; dated Jan. 11, 2010.
Final Office action dated Aug. 20, 2009 from U.S Appl. No. 11/213,357.
Office action dated Mar. 5, 2009 from U.S. Appl. No. 11/213,357.
Office action dated Sep. 18, 2008 from U.S. Appl. No. 11/213,357.
Office action dated Apr. 4, 2008 from U.S. Appl. No. 11/213,357.

\* cited by examiner

| AS Permissions List File | | |
|---|---|---|
| PK | AS Identity | VARCHAR(255) |
| | Repository Data Size Limit | INTEGER |
| | AS Realm | VARCHAR(255) |
| | UDR Allowed | BIT |
| | UDR RepositoryData Allowed | BIT |
| | UDR PublicIdentity Allowed | BIT |
| | UDR IMS UserState Allowed | BIT |
| | UDR S-CSCFName Allowed | BIT |
| | UDR IFC Allowed | BIT |
| | UDR Loc Info Allowed | BIT |
| | UDR User State Allowed | BIT |
| | UDR Charging Info Allowed | BIT |
| | UDR MSISDN Allowed | BIT |
| | PUR Allowed | BIT |
| | PUR RepositoryData Allowed | BIT |
| | SNR Allowed | BIT |
| | SNR RepositoryData Allowed | BIT |
| | SNR IMS UserState Allowed | BIT |
| | SNR S-CSCFName Allowed | BIT |
| | SNR IFC Allowed | BIT |

Figure 7

AUTOMATED APPLICATION SERVER (AS) PERMISSIONS PROVISIONING

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS

This application is related to the following U.S. patent applications, which are all assigned to the present assignee:

"HSS Application Server (AS) Database With Class Of Service (COS)", U.S. application Ser. No. 11/213,357, filed Aug. 26, 2005, inventors: Ayers et al.;

"Charging Database with Class of Service (COS)", U.S. application Ser. No. 11/212,246, filed Aug. 26, 2005, inventors: Ayers et al.; and "Initial Filter Criteria (IFC) Database with Class of Service (COS)", U.S. application Ser. No. 11/213,361, filed Aug. 26, 2005, inventors: Ayers et al.

BACKGROUND

Telephones no longer just transmit and receive telephone calls. Devices including cellular telephones, PDAs, laptop computers, and so on, collectively referred to as user equipment (UE), may transmit and receive telephone calls, may transmit and receive text messages, may participate in video-conferencing, may participate in multi-player gaming, may share content, and so on. These types of activities may be referred to collectively as multimedia services. In some cases these multimedia services may be provided over the Internet using the Internet Protocol (IP).

An IP multimedia core network subsystem (IMS) includes core network (CN) elements for providing IP multimedia services. These IP multimedia services may include telephony (e.g., Voice over IP (VoIP)), push to talk over cellular (PoC), text messaging, and so on. Conventionally, services may have been provided by a stand-alone electronic system, computer, and/or computer system. In the IMS environment, services are hosted by an application server (AS). An AS may be a physical and/or logical entity. A single AS may host multiple services (e.g., telephony, messaging) and/or a single service may require more than one AS. An AS may be described by data that characterizes various attributes like a service provider location, capability, availability, and so on.

An IMS may define how requests for service are routed to an AS that can provide the service. An IMS also may also define which protocols are supported in a communication network, how a user is charged, and so on. Services are not provided in a vacuum. User demand may provide a rationale for providing services. Furthermore, not all services are provided free of charge. Thus, organizations may establish an IMS to facilitate providing services to users, tracking usage, and charging users for services provided, among other things. Therefore, data concerning users and application servers may be stored. Furthermore, data concerning how an AS may interact with user data may be stored.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 7 illustrates an example schema.

DETAILED DESCRIPTION

Figure 1:
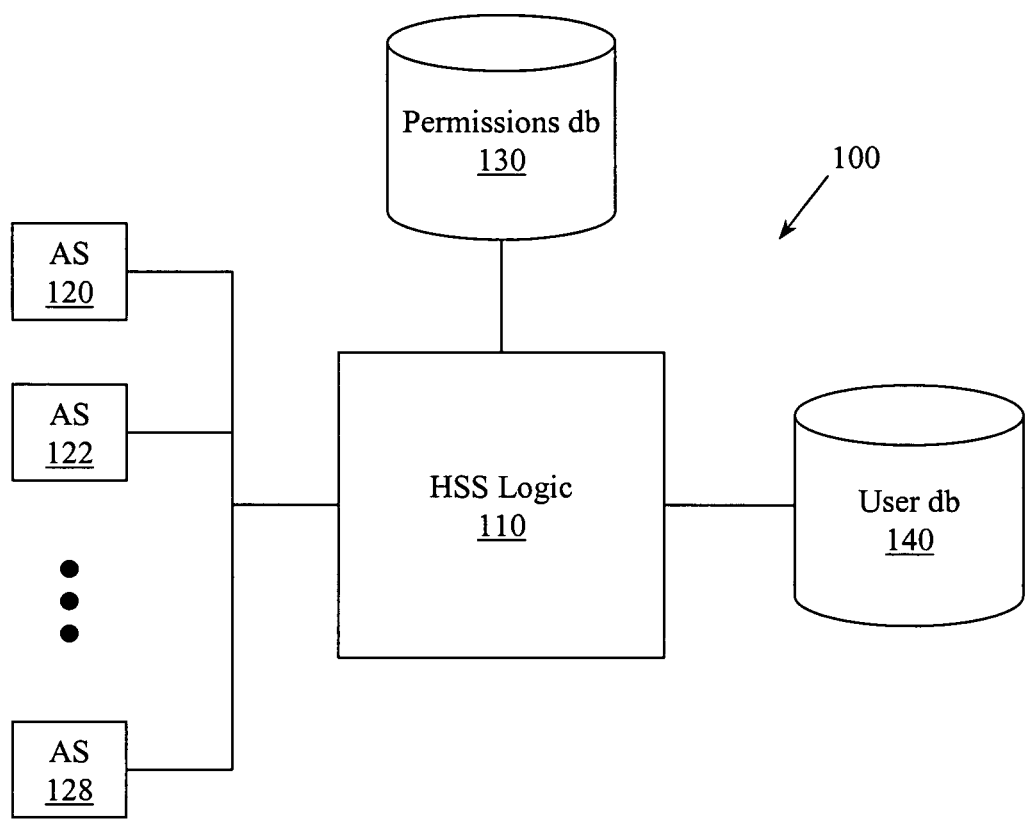
FIG. 1 illustrates an example system associated with automated application server (AS) permissions provisioning.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that stores instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical media with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored on a computer-readable storage medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, on the environment in which it runs, and/or on the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be developed using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, automatically performing an action, (e.g., automatically adding, automatically updating) or the like, refer to actions and processes of a computer system, logic, processor, or similar electronic device that manipulates and transforms data represented as physical (electronic) quantities.

FIG. 1 illustrates an example system 100 associated with automated AS permissions provisioning. System 100 may, for example, be part of a Home Subscriber Server (HSS). System 100 may facilitate actions including automatically discovering application servers that become active in an IMS, automatically learning about the newly discovered application servers, selectively provisioning permissions concerning the newly discovered application servers, and so on. When an AS is added to an IMS, or when an AS becomes newly active in an IMS, the AS may generate a request concerning user data. The request may be intended to acquire some user data, to change some user data, and/or to register to be notified when certain user data changes. However, an IMS will not simply freely hand over user data to an unknown AS.

Thus, permissions information concerning interactions between an AS and user data may be stored by an IMS. Stored permissions information may facilitate controlling the types of messages that will be accepted from an AS by an HSS. By way of illustration, a first AS may be allowed to read user data, to write user data, and to register for notifications concerning changes to user data. By way of further illustration, a second AS may only be allowed to read user data, while a third AS may be allowed to read user data and be notified about changes to user data. Additionally and/or alternatively, stored permissions information may facilitate controlling the type of user data with which an AS will be allowed to interact. For example, an AS may be allowed to access some user data (e.g., public identifier) but may not be allowed to access some other user data (e.g., current location).

An AS (e.g., 120, 122, . . . 128) may be configured to provide multimedia services to which users may subscribe. The services may include, for example, telephony, video-conferencing, multi-player gaming, and so on. With a service like telephony an AS may provide sub-services including, for example, call forwarding, call waiting, multi-party calling, and so on. In different examples, an AS may be located in the home network of a user or in an external, third-party network. An AS may be described by information concerning, for example, an address, a location, a service(s) provided, a name, how processing should proceed if an AS can not be accessed, and so on.

System 100 may include an HSS logic 110 configured as a portion of an IMS through which a user may access a service.

An AS may communicate with HSS logic 110 using, for example, the Sh protocol. An example Sh protocol is described in 3GPP TS 29.328 and 29.329 V5 10.0 (2005-06). One example Sh protocol may define commands including a user data request (UDR) in which an AS asks an HSS to provide the AS with certain user data. The example Sh protocol may also include a profile update request (PUR) in which an AS asks an HSS to update certain data with values provided by the AS. The example Sh protocol may also include a subscribe notify request (SNR) in which an AS asks an HSS to notify the AS when certain user data values change. The HSS may be configured to accept and/or reject messages from application servers based, at least in part, on permissions information associated with an AS. An example set of Sh messages are described in connection with FIG. 6.

Thus, system 100 may also include a permissions database 130. Permissions database 130 may store, for example, one record per AS. The record may store information concerning, for example, which commands to accept from an AS and upon which user data an accepted command can operate. One example layout for a permissions database is described in schema 700 (FIG. 7). In some examples, "database" is used to refer to a table. In other examples, "database" may be used to refer to a set of tables. In still other examples, "database" may refer to a data store and/or a set of data stores. In some examples, "database" may also include methods for accessing and/or manipulating tables, files, data stores, and so on.

System 100 may also include a user database 140 that is configured to store information concerning a user that may subscribe to access a service provided by an AS. The user information may be stored in a record in user database 140. A user record may include, for example, data describing a user identity, a user location, user billing information, services to which a user is subscribed, and so on. The user data with which a message from an AS seeks to interact may be stored in user database 140. While HSS logic 110, permissions database 130, and user database 140 are illustrated as three separate components it is to be appreciated that in different examples these elements may be arranged in a greater and/or lesser number of logical and/or physical elements. Additionally, HSS logic 110, permissions database 130, and user database 140 may be arranged as components of an IMS.

Thus, in one example, system 100 may include HSS logic 110 that is operably connectable to user database 140, application servers (e.g., 120, 122, . . . 128), and permissions database 130. HSS logic 110 may be configured as part of an IMS and thus may be configured to receive an AS-to-user-database-interface-message (AUDIM) from an AS. After receiving the AUDIM, HSS logic 110 may selectively update permissions database 130. How and/or whether permissions database 130 is updated may depend, at least in part, on data in the AUDIM. Additionally, HSS logic 110 may be configured to update permissions database 130 only after determining that the IMS is in an AS permissions auto-configure state.

In one example, permissions database 130 may be configured to store permissions information for controlling an AUDIM initiated interaction between an AS and user database 140. The AUDIM may be, for example, a user data request (UDR), a profile update request (PUR), and a subscriber notify request (SNR). The UDR, the PUR, and the SNR may be defined in a protocol like an IMS Sh protocol.

In one example, updating permissions database 130 may include automatically adding a record to permissions database 130. The record may be associated with an AS that provided an AUDIM and may include information for controlling future interactions between the AS that provided the AUDIM and user database 140. Conventionally, this record, if added at all, would have been manually created and inserted.

Figure 2:
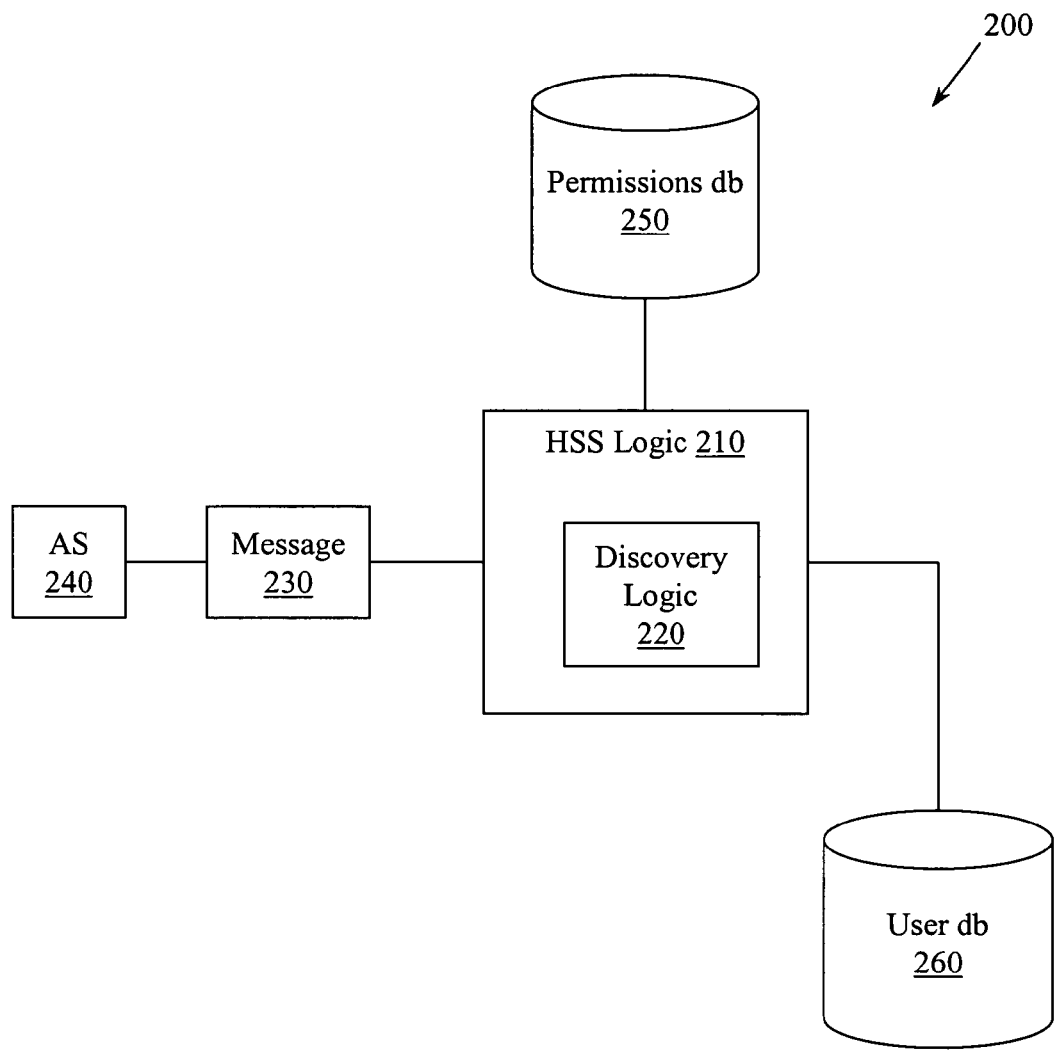
FIG. 2 illustrates an example system associated with automated AS permissions provisioning.

FIG. 2 illustrates an example system 200 associated with automated AS permissions provisioning. System 200 includes components similar to those described in connection with FIG. 1. For example, system 200 includes a user database 260, an HSS logic 210, and a permissions database 250. System 200 may facilitate controlling an interaction between an AS 240 and user database 260, the action being initiated by a message 230 sent from AS 240. Message 230 may be, for example, an AUDIM message (e.g., SNR, UDR, PUR) described in the Sh protocol.

In one example, HSS logic 210 may include a discovery logic 220 that is configured to determine whether an AS from which an AUDIM is received is related to a record in permissions database 250. While discovery logic 220 is illustrated inside HSS logic 210, it is to be appreciated that in other examples discovery logic 220 may stand apart from and be operably connected to HSS logic 210.

HSS logic 210 may be configured to update permissions database 250 when discovery logic 220 determines that an AS from which an AUDIM is received is not related to a record in permissions database 250. This determination may be made, for example, by searching permissions database 250 for an AS identifier that matches an AS identifier provided by AS 240 in AUDIM 230.

In one example, selectively updating permissions database 250 may include automatically adding a record to permissions database 250. The record may be added, for example, by HSS logic 210 and/or discovery logic 220. Conventionally, this record may have been manually created and added. The record may be related to an AS from which the AUDIM is received. For example, the record may include an AS identifier retrieved from the AUDIM and may store control information associated with the AUDIM. Thus, discovery logic 220 may be configured to establish pre-determined (e.g., default) values in the record added to permissions database 250.

The default values may be based, at least in part, on analyzing values stored in fields in the AUDIM. For example, an AS realm field and/or AS identifier field may provide information that identifies a degree of trustworthiness to be associated with the AS. This degree of trustworthiness may in turn control the types of messages that will be accepted from the AS. The pre-determined configurable values may be used to control AUDIM initiated interactions between an AS and the user database. For example, the UDR allowed field 720, the PUR allowed field 740, and the SNR allowed field 750 described in connection with FIG. 7 may be fields whose values can be configured. Thus, data stored in these fields may control whether data can be provided from the user database to the AS, whether data can be provided from the AS to the user database, and whether the AS can subscribe to receive notifications from HSS logic 210 concerning updates to data in the user database.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that various actions could occur concurrently, substantially in parallel, and/or at substantially different points in time.

Figure 3:
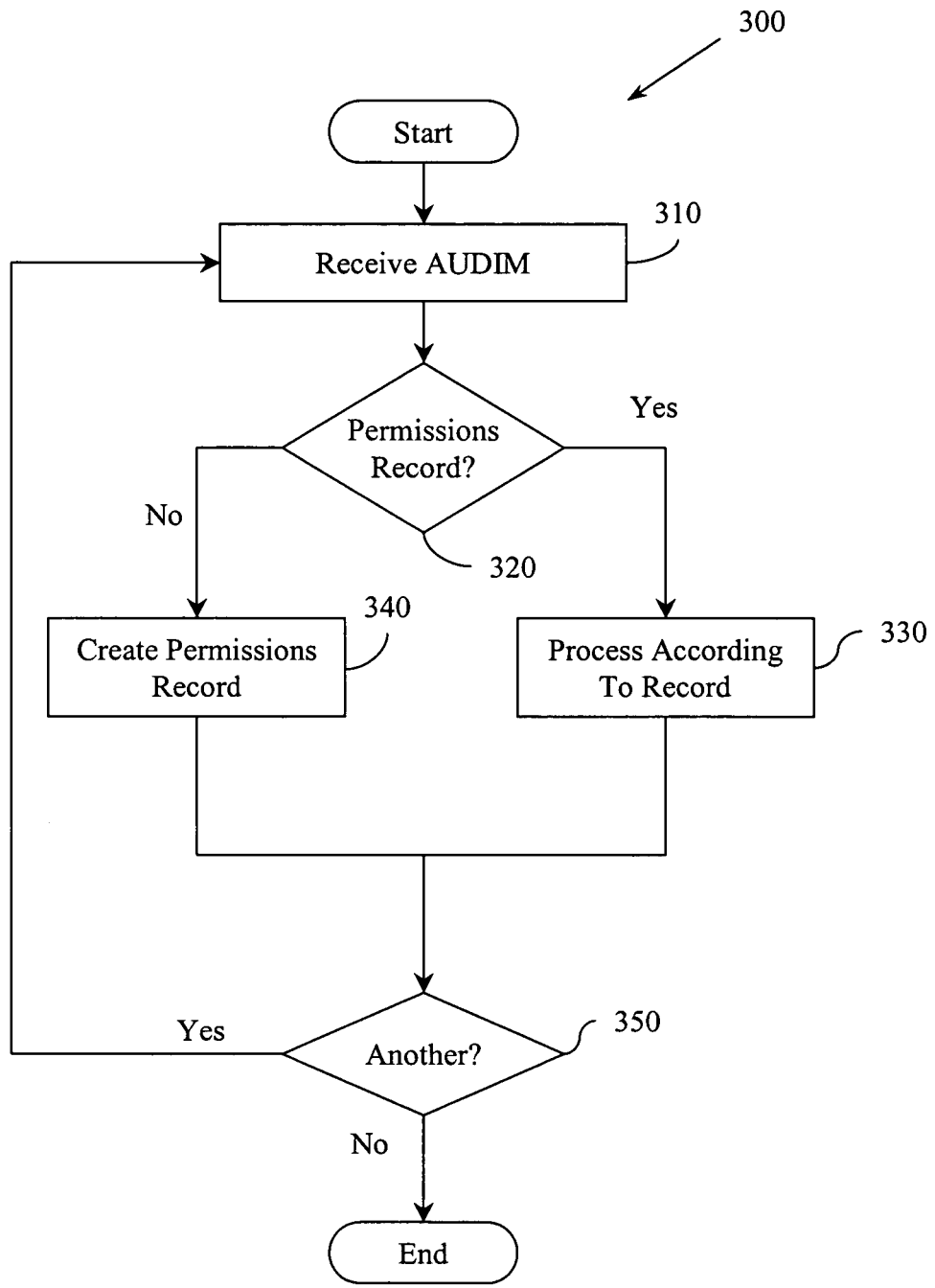
FIG. 3 illustrates an example method associated with automated AS permissions provisioning.

FIG. 3 illustrates an example method 300 associated with automatically provisioning AS permissions in an HSS. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methods can be implemented as processor executable instructions and/or operations provided by a computer-readable medium. In another example, the processing blocks may represent functions and/or actions performed by functionally equivalent circuits like an analog circuit, a digital signal processor circuit, an application specific integrated circuit (ASIC), or other logic device.

Method 300 may include, at 310, receiving an AUDIM from an AS. The AUDIM may be configured to initiate an interaction between the AS and a user database. The AS may be configured to provide a service for a user of the IMS. The user database may store data concerning the user.

Method 300 may also include, at 320, determining whether a permissions database includes a record concerning the AS. If the determination is Yes, processing may continue at 330 where the AUDIM is processed according to the existing record. If the determination is No, processing may continue at 340. In one example, the permissions database and the user database may be components of an IMS. For example, the permissions database and the user database may be portions of an HSS database.

Method 300 may include, at 340, automatically adding to the permissions database an entry concerning the AS. The entry may be, for example, a record. The record may be configured to store data to control the interaction between the AS and a user database. A layout for an example record is described in connection with FIG. 7. The record may be populated with default values based, for example, on a decision(s) made by a systems administrator. Conventionally, the record may have been manually established by a systems administrator and manually inserted in the database.

Method 300 may also include, at 350, making a determination concerning whether to process another AUDIM. If the determination is Yes, then processing may return to 310, otherwise processing may conclude. The AUDIM may be, for example, a user data request (UDR), a profile update request (PUR), a subscribe notify request (SNR), and the like. The AUDIM may be defined, for example, in the Sh protocol.

While FIG. 3 illustrates various actions occurring in serial, it is to be appreciated that various actions illustrated in FIG. 3 could occur substantially in parallel. By way of illustration, a first process could receive AUDIMs, a second process could examine a permissions database with respect to whether the AS associated with the AUDIM is described in the permissions database, and a third process could update the permissions database. While three processes are described, it is to be appreciated that a greater and/or lesser number of processes could be employed and that lightweight processes, regular processes, threads, and other approaches could be employed.

Figure 4:
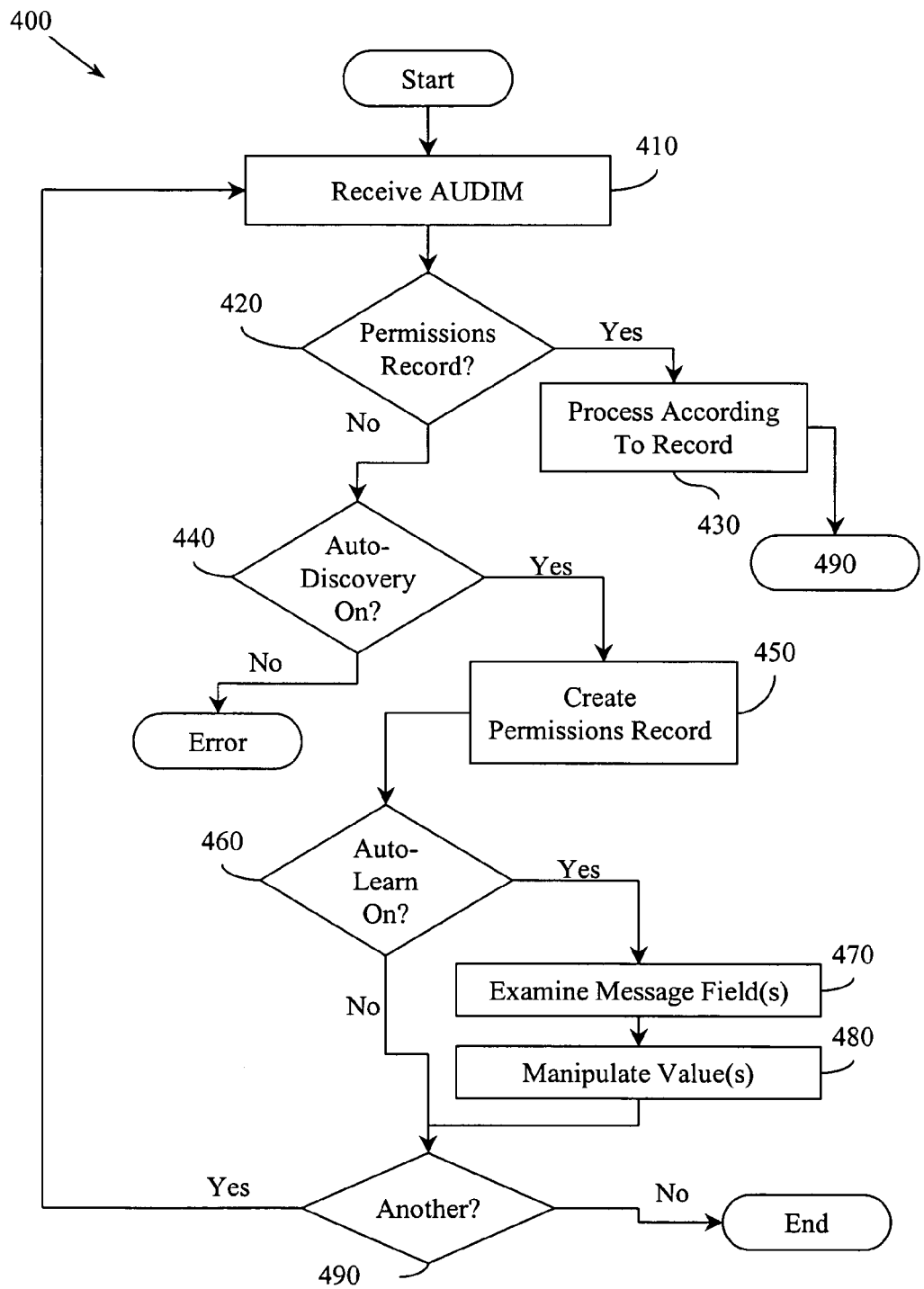
FIG. 4 illustrates an example method associated with automated AS permissions provisioning.

FIG. 4 illustrates an example method 400 associated with automatically provisioning AS permissions in an HSS. Method 400 includes elements similar to those described in connection with FIG. 3. For example, an AUDIM is received at 410, a determination concerning whether a permissions record associated with an AS that provided the AUDIM exists is made at 420, and regular processing occurs at 430.

However, method 400 may include additional actions. For example, method 400 may include, at 440, determining whether the permissions database is in an auto-discovery state. In an auto-discovery state, the permissions database may be configured to automatically have a record associated with a newly discovered AS added to the database. Thus, if the permissions database is in an auto-discovery state, processing may move ahead at 450, otherwise an error condition may exist. At 450, a record may automatically be added to the permissions database. Additional processing that examines the received AUDIM may be undertaken to customize the record added at 450. Conventionally, the record, if added at all, would be manually added and/or customized at a later time.

Thus, method 400 may also include, at 460, making a determination concerning whether the permissions database is in an auto-learn state. In an auto-learn state, the permissions database may have newly added records automatically reconfigured. If the permissions database is not in an auto-learning state, the record added at 450 may be left alone and processing may continue at 490. If the permissions database is in an auto-learning state, then method 400 may continue at 470 to examine a field(s) in the AUDIM. Method 400 may include, at 480, automatically manipulating a value in a field(s) in the record added to the permissions database at 450. How the values in the fields are manipulated may be based, at least in part, on the value(s) in the AUDIM field(s). Values in these configurable fields may facilitate controlling interactions between an AS and a user database by controlling, for example, which types of AUDIM(s) will be accepted from the AS, and upon which data in the user database an accepted AUDIM will be allowed to operate. It is to be appreciated that manipulating a value may include updating a value.

For example, an AS that provides an AUDIM with an AS realm field value of *.abc may be allowed to provide a first set of commands (e.g., SNR) that may access a first set of data. Similarly, an AS that provides an AUDIM with an AS realm field value of *.xyz may be allowed to provide a second set of commands (e.g., SNR, UDR) that may access a second larger set of data, and an AS that provides an AUDIM with an AS realm field value of *.jtk is retrieved may be allowed to provide a third set of commands (e.g., SNR, UDR, PUR) that may access all and/or substantially all available user data. While the AS realm field in an AUDIM is described, it is to be appreciated that other AUDIM fields may be examined to determine whether and/or how to reconfigure a record created at 450.

Method 400 may also include, at 490, making a determination concerning whether to process another AUDIM. If the determination at 490 is Yes, then processing may return to 410, otherwise processing may conclude.

In one example, methods are implemented as processor executable instructions and/or operations stored on a computer-readable medium. Thus, in one example, a computer-readable medium may store processor executable instructions operable to perform a method that includes receiving from an AS an AUDIM configured to initiate an interaction between the AS and a user database and, upon determining that a permissions database does not include a record concerning the AS, automatically adding to the permissions database a record concerning the AS. The record may store data for controlling the interaction between the AS and a user database. In one example, the permissions database and the user database may be components of an IMS and the AS may provide a service(s) for a user of the IMS. In the example, the user database may store data concerning the IMS user.

While the above method is described being stored on a computer-readable medium, it is to be appreciated that other example methods described herein can also be stored on a computer-readable medium.

Figure 5:
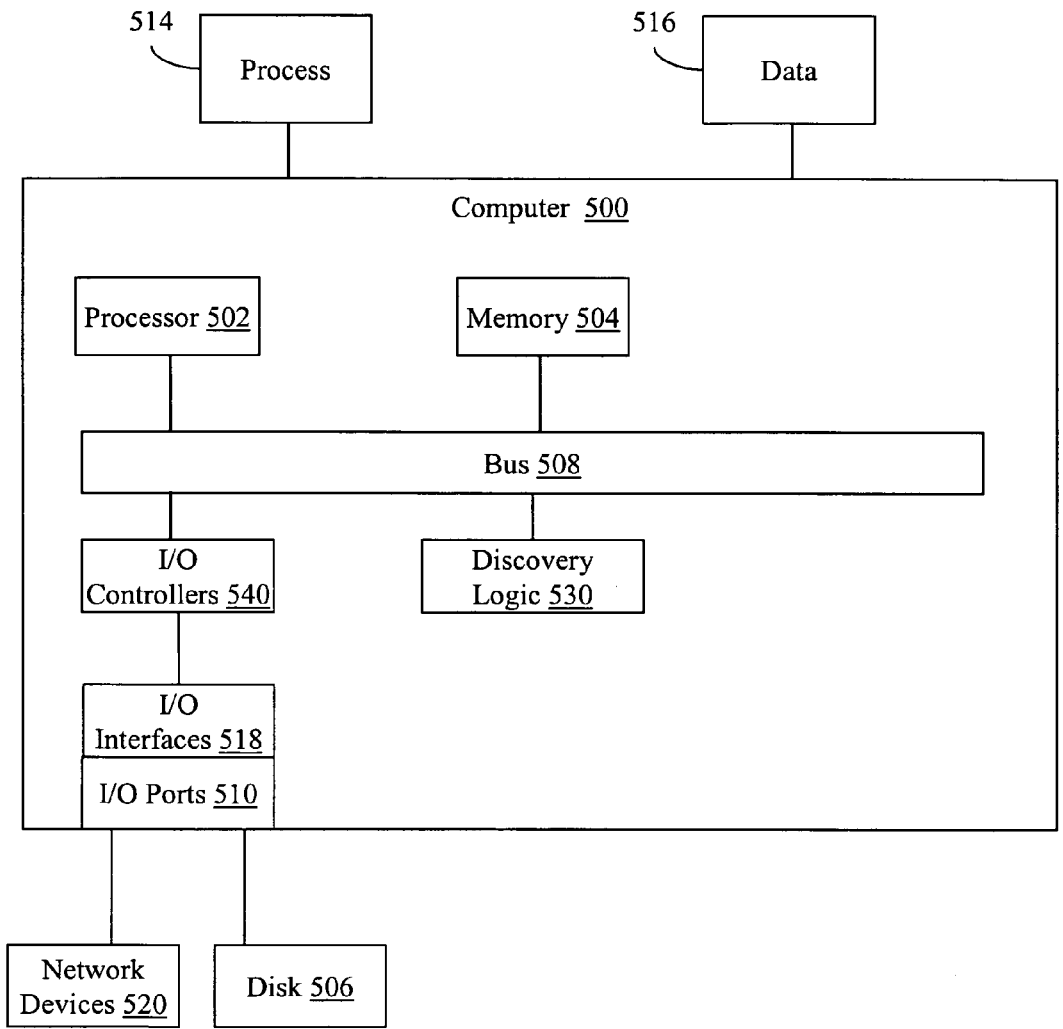
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, computer 500 may include a discovery logic 530 configured to facilitate detecting an AS. Discovery logic 530 may also facilitate automatically provisioning AS permissions for an AS. Discovery logic 530 may provide means (e.g., hardware, software, firmware) for detecting an attempt by an AS to interact with an IMS user data, means (e.g., hardware, software, firmware) for determining whether the AS associated with the attempt is described by IMS permissions data that facilitates controlling interactions between application servers and IMS user data, and means (e.g., hardware, software, firmware) for selectively manipulating the IMS permissions to control interactions between the AS associated with the attempt and the IMS user data. While discovery logic 530 is illustrated as a hardware component operably connected to bus 508, it is to be appreciated that in one example discovery logic 530 may be implemented as software stored on disk 506, brought into memory 504 as a process 514, and executed by processor 502.

Generally describing an example configuration of the computer 500, the processor 502 can be a variety of various processors including dual microprocessor and other multi-processor architectures. The memory 504 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can include, but is not limited to, devices including a magnetic disk drive, a solid state disk drive, a floppy disk drive, a tape drive, a Zip drive, a flash memory card, and/or a memory stick. Furthermore, the disk 506 can include optical drives including a CD-ROM, a CD recordable drive (CD-R drive), a CD rewriteable drive (CD-RW drive), and/or a digital video ROM drive (DVD ROM). The memory 504 can store processes 514 and/or data 516, for example. The disk 506 and/or memory 504 can store an operating system that controls and allocates resources of the computer 500.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and the like. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks like integrated services digital networks (ISDN), packet switching networks, and digital subscriber lines (DSL).

Figure 6:
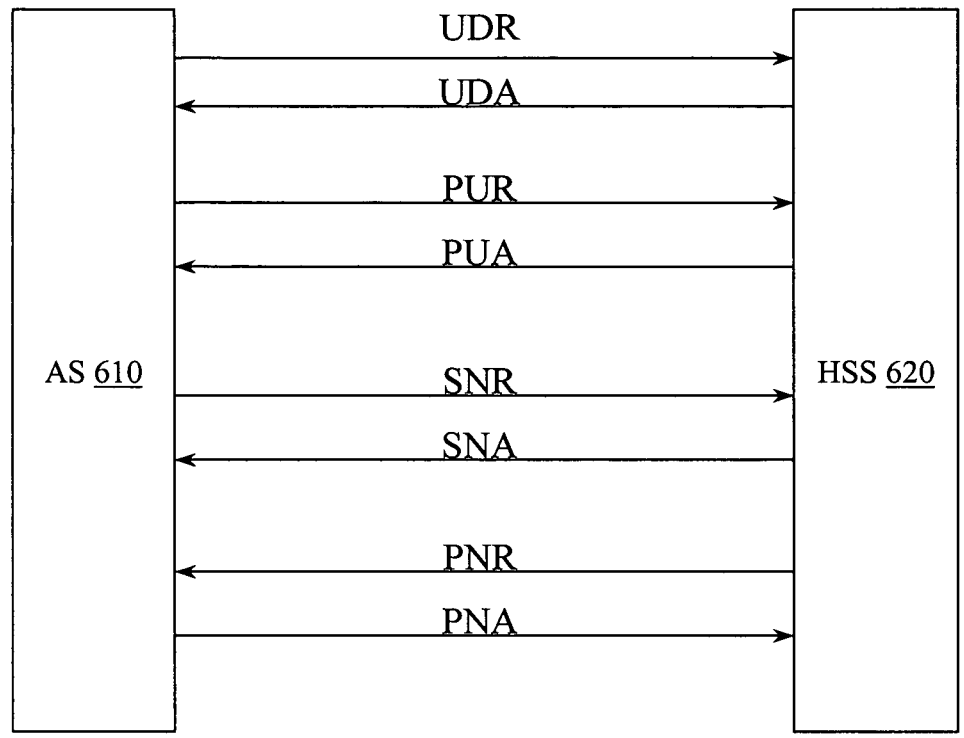
FIG. 6 illustrates an example set of AS-to-user-database-interface-messages.

Referring now to FIG. 6, an example set of AUDIMs are illustrated. One example set of these messages may be described in 3GPP TS 29.328 and 29.329 V5 10.0 (2005-06), which are technical specifications for the IMS Sh Interface. The AUDIM may include, but is not limited to, a user data request (UDR) and a user data answer (UDA), a profile update request (PUR) and profile update answer (PUA), and a subscribe notify request (SNR) and subscribe notify answer (SNA). These commands may originate at an AS 610 and be answered by an HSS 620. The commands may be intended to seek access and/or manipulate user data. The commands may include information about the originating AS (e.g., AS identity, AS realm). The AUDIM may also include a push notification request (PNR) and push notification answer (PNA) that originate at an HSS 620 and are answered by an AS 610.

FIG. 7 illustrates an example schema 700 that describes an example layout for a data store employed in connection with the example systems and methods described herein. It is to be appreciated that schema 700 is but one example layout and that different tables, different table arrangements, different dependencies, and so on may be employed.

Relating schema 700 to the example systems and methods described above, data store 710 illustrates the organization of one example AS permissions list file. The data store 710 includes entries that control whether various messages will be accepted from an AS and upon which IMS user data accepted messages will be allowed to operate. For example, entry 720 controls whether a UDR message will be accepted and entry 730 controls whether an accepted UDR message will be allowed to interact with a user public identity. The user public identity may be stored, for example, in a user data store. Entry 740 controls whether a PUR message will be accepted. Similarly, entry 750 controls whether an SNR message will be accepted.

Example systems and methods described herein may be configured to initially automatically produce a default entry in a data store like AS Permissions List File 710. The default entry may include a set of fields that may initially be set to default values. As described above, in some cases, these default values may be automatically manipulated based, for example, on information gained from a message from an AS. For example, entry 760 describes a realm in which an AS operates. Based on this realm value, default values may be reconfigured leading to more or less messages being accepted and/or allowing access to more or less user data. While the AS realm field is described as having a value upon which decisions to reconfigure default values may be made, it is to be appreciated that other data associated with an AS providing a message may be evaluated to determine whether and/or how to reconfigure default values. While a file is illustrated, it is to be appreciated that in other examples this information may be stored in other forms.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A device connected to a network, comprising:
   a home subscriber server (HSS) logic, including instructions stored on a computer-readable storage memory operably connectable to entities including a user database, an application server (AS), and a permissions database,
   wherein the HSS logic, permissions database and user database are components of an internet protocol (IP) multimedia core network subsystem (IMS),
   wherein the HSS logic is to receive an AS-to-user-database-interface-message (AUDIM) from the AS,
   wherein the HSS logic includes a discovery logic to determine whether the AS is related to any records in the permissions database,
   wherein, in response to the discovery logic determining that the AS is not related to any records in the permissions database, the HSS logic is to determine that the permissions database is in an auto-discovery state and automatically update the permissions database by creating a record related to the AS from which the AUDIM is received and adding the created record to the permissions database, wherein the record created is based, at least in part, on one or more fields in the AUDIM, and
   wherein the user database is to store user data concerning one or more users of the IMS, the AS is to provide one or more services to the one or more users, and the permissions database is to store permissions information to control an AUDIM-initiated interaction between the AS and the user database.

2. The device of claim 1, wherein the AUDIM is one of a user data request (UDR), a profile update request (PUR), and a subscriber notify request (SNR), the UDR, the PUR, and the SNR being defined in an IMS Sh protocol.

3. The device of claim 1, wherein the created record is associated with the AS that provided an AUDIM.

4. The device of claim 1, wherein the HSS logic is to selectively automatically update the permissions database by creating a record related to the AS from which the AUDIM is received and adding the record to the permissions database upon determining that the IMS is in an AS permissions auto-configure state.

5. The device of claim 4, wherein the created record is associated with the AS that provided an AUDIM.

6. The device of claim 5, wherein the discovery logic is to establish one or more pre-determined configurable values in one or more fields in the record added to the permissions database.

7. The device of claim 6, the one or more fields in the AUDIM including one or more of an AS address, an AS realm, an AS name, and an AS type.

8. The device of claim 7, wherein the pre-determined configurable values in the record added to the permissions database are to control an AUDIM-initiated interaction between an AS and the user database.

9. The device of claim 8, wherein the interaction includes one of providing data from the user database to the AS, providing data from the AS to the user database, and the AS subscribing to receive notifications from the HSS logic concerning updates to the user database.

10. The device of claim 9, wherein the user data includes one or more of a user identity, a user state, a user location, and a user metadata.

11. A device connected to a network, comprising:
    memory;
    a home subscriber server (HSS) logic operably connectable to internet protocol (IP) multimedia core network service (IMS) components including a user database, an application server (AS), and a permissions database, wherein the HSS logic is as a portion of an IMS, and the HSS logic is to receive an AS-to-user-database-interface-message (AUDIM) from the AS; and
    a discovery logic to determine whether the AS from which the AUDIM is received is related to a record in the permissions database,
    wherein, in response to determining that the AS from which the AUDIM is received is not related to a record in the permissions database, the discovery logic is to determine that the permissions database is in an auto-discovery state and automatically update the permissions database by automatically creating a record related to the AS and adding the created record to the permissions database,
    wherein the discovery logic is to establish one or more pre-determined configurable values in one or more fields in the created record added to the permissions database, the created record being based, at least in part, on a value of one or more fields in the AUDIM, wherein the predetermined configurable values are to control an AUDIM-initiated interaction between the AS and the user database, wherein the AUDIM includes one of a user data request (UDR), a profile update request (PUR), and a subscriber notify request (SNR), the UDR, the PUR, and the SNR being defined in an IMS Sh protocol, and wherein the user database is to store user data concerning one or more users of the IMS, the AS is to provide one or more services to the one or more users, and the permissions database is to store permissions information to control the AUDIM-initiated interaction between the AS and the user database.

12. A method, comprising:

receiving from an application server (AS) an AS-to-user-database-interface-message (AUDIM) to initiate an interaction between the AS and a user database; and in response to determining that a permissions database does not include a record concerning the AS, determining that the permissions database is in an auto-discovery state and automatically creating and adding to the permissions database a record concerning the AS, wherein the record is to store data to control the interaction between the AS and the user database, and the record is based, at least in part, on a value of one or more fields in the AUDIM, wherein the permissions database and the user database are components of an internet protocol (IP) multimedia core network services subsystem (IMS), the AS is to provide a service for a user of the IMS, and the user database is to store data concerning the user.

13. The method of claim 12, wherein the AUDIM includes one of a user data request (UDR), a profile update request (PUR), and a subscribe notify request (SNR) defined in an IMS Sh protocol.

14. The method of claim 12, further comprising:

upon determining that the permissions database is in an auto-learn state, automatically manipulating a value in one or more configurable fields in the record created and added to the permissions database.

15. The method of claim 14, wherein the value in the one or more configurable fields in the created record added to the permissions database is to control interactions between the AS and the user database by controlling one or more of which types of AUDIM will be accepted from the AS, and which data in the user database an accepted AUDIM will be allowed to operate.

16. A non-transitory computer-readable medium having stored thereon a set of instructions that, when executed by a computer, result in:

receiving from an application server (AS) an AS-to-user-database-interface-message (AUDIM) to initiate an interaction between the AS and a user database; and in response to determining that a permissions database does not include a record concerning the AS, determining that the permissions database is in an auto-discovery state and automatically creating and adding to the permissions database a record concerning the AS, wherein the record is to store data to control the interaction between the AS and the user database, and the record is based, at least in part, on a value of one or more fields in the AUDIM, and wherein the permissions database and the user database are components of an internet protocol (IP) multimedia core network services subsystem (IMS), the AS is to provide a service for a user of the IMS, and the user database is to store data concerning the user.

* * * * *